UNITED STATES PATENT OFFICE.

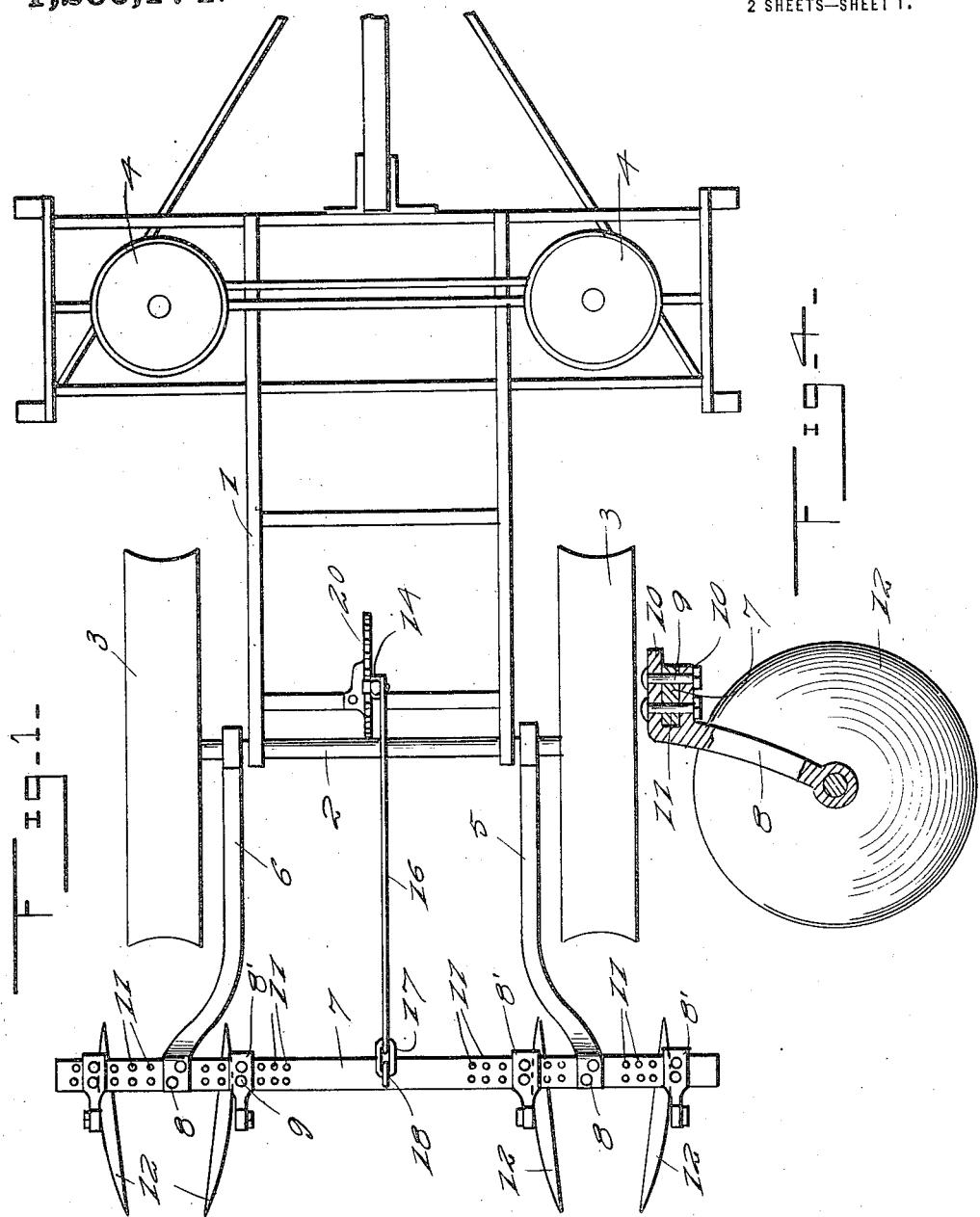

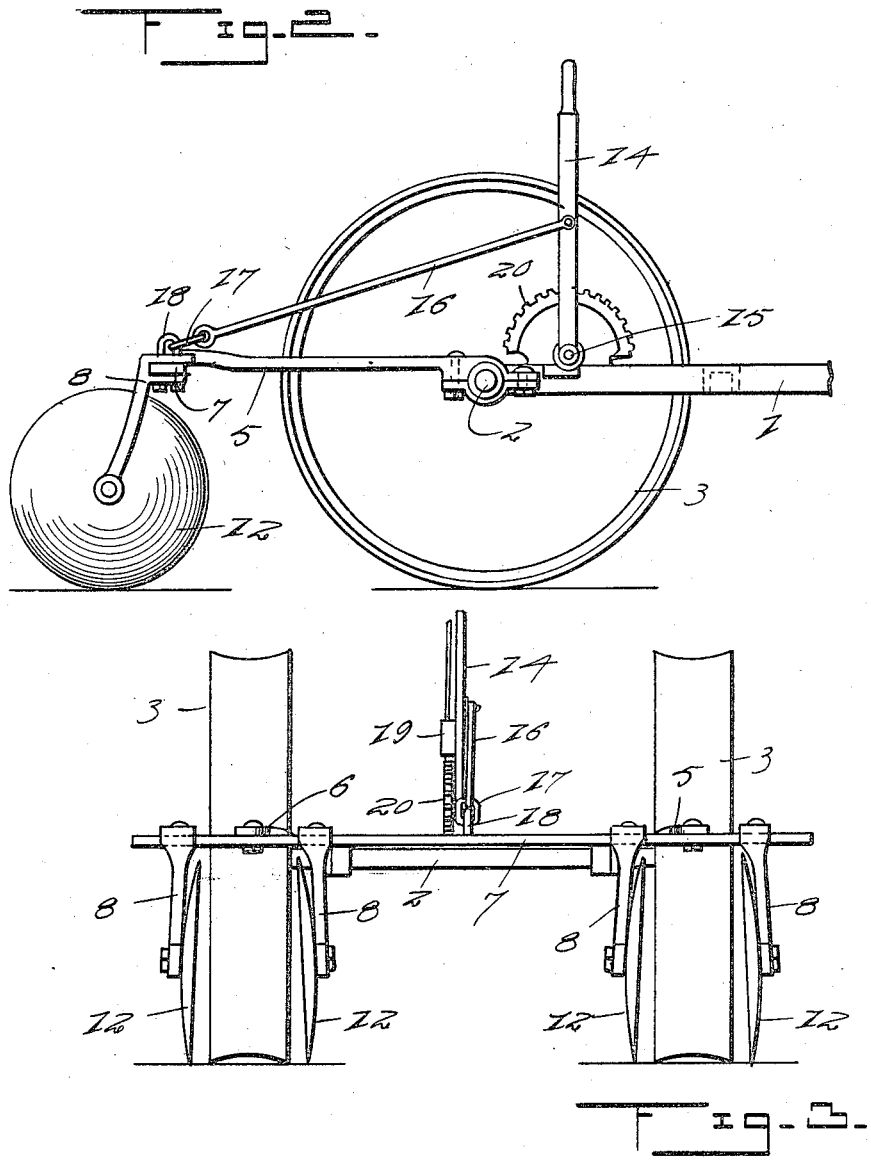

FRED M. FISHER, OF NEAVITT, MARYLAND, ASSIGNOR OF ONE-THIRD TO WILLIAM T. JONES, OF BALTIMORE, MARYLAND.

RIDGING ATTACHMENT FOR PLANTERS.

1,260,174.

Specification of Letters Patent.

Patented Mar. 19, 1918.

Application filed October 7, 1916. Serial No. 124,319.

*To all whom it may concern:*

Be it known that I, FRED M. FISHER, a citizen of the United States, residing at Neavitt P. O., in the county of Talbot and State of Maryland, have invented certain new and useful Improvements in Ridging Attachments for Planters; and I do hereby declare the following to be a full, clear, and exact description of the invention, such as will enable others skilled in the art to which it appertains to make and use the same.

This invention relates to a ridging attachment for corn planters, and the primary object of the invention is to provide a supporting structure which is pivotally connected to the main supporting axle of the corn planter so that it may be moved into an operative or inoperative position, as desired which supporting structure has a plurality of ridging disks adjustably connected thereto and arranged in pairs rearwardly of the supporting wheels of the corn planter for ridging the dirt in rows along side of the planted grain.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of an ordinary planter showing the improved ridging attachment connected thereto, Fig. 2 is a side elevation of a fragment of the corn planter having one of the wheels removed, Fig. 3 is a rear elevation of a planter showing the invention attached thereto, and Fig. 4 is a fragmentary view partially in section of the attachment.

Referring more particularly to the drawings, 1 designates a corn planter of any ordinary desired construction which includes a supporting axle 2 upon which the usual type of supporting wheels 3 are mounted. The wheels 3 are positioned directly in the rear of the seed dispensing structure 4, as is ordinary.

A pair of bars 5 and 6 are pivotally connected to the axle 2 and extend rearwardly therefrom. The rear end of the bars 5 and 6 are attached to a cross bar 7, as shown at 8. The cross bar 7 is positioned rearwardly of the wheels 3 and it has a plurality of brackets 8' adjustably connected thereto in any suitable manner preferably by bolts 9 which extend through horizontally positioned arms 10 which are formed on the upper ends of the brackets 8' and through openings 11 which are formed in the bar 7. A plurality of sets of openings 11 are provided for permitting of the adjustment of the brackets laterally with respect to each other. The brackets 8' have disks 12 rotatably supported by their lower ends, which disks are positioned for ridging the dirt along the rows in which the grain is planted by the planter structure.

A hand lever 14 is pivotally supported by the corn planter as shown at 15 and it has a rod 16 connected thereto, which rod is connected in any suitable manner, such as by a link 17 and a U-shaped bolt 18 to the bar 7 so that when the hand lever 14 is operated, the bar 7, and consequently the disks 12 will be raised or lowered out of or into a ridging position, depending upon the direction in which the hand lever 14 is moved. A dog mechanism 19 is carried by the hand lever 14 and it coacts with a quadrant 20 for holding the lever and consequently the bar 7 and the disks 12 in their various adjusted positions.

In reducing the invention to practice, certain minor features of construction, combination and arrangement of parts may necessitate alteration to which the patentee is entitled provided such alterations are comprehended within the scope of what is claimed.

What is claimed is:—

In a ridging attachment for corn planters, a pair of pivoted supporting bars, a cross bar connected to the rear ends of said supporting bars, said cross bar provided with a plurality of spaced openings arranged in pairs, a plurality of disk carrying brackets, each of said brackets having spaced parallel horizontal arms integrally formed upon its upper end and extending forward therefrom, said arms engaging the upper and lower surfaces of said cross bar to prevent tilting of the brackets independently of the cross bar, a pair of bolts extending through said horizontal arms and said cross bar for connecting the brackets to the cross bar and to prevent pivotal movement of the brackets with respect to the cross bar, and a ridging disk carried by each of said brackets.

In testimony whereof I affix my signature in presence of two witnesses.

FRED M. FISHER.

Witnesses:
WILLIAM T. JONES,
A. CLAY LEWIS.